(12) United States Patent
Arlt et al.

(10) Patent No.: US 8,484,946 B2
(45) Date of Patent: Jul. 16, 2013

(54) METHOD AND DEVICE FOR DETERMINING AN OXYGEN STORAGE CAPACITY OF A CATALYTIC CONVERTER OF AN INTERNAL COMBUSTION ENGINE AND METHOD AND DEVICE FOR DETERMINING A DYNAMIC TIME DURATION FOR EXHAUST PROBES OF AN INTERNAL COMBUSTION ENGINE

(75) Inventors: Tino Arlt, Regensburg (DE); Gerd Rösel, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 338 days.

(21) Appl. No.: 13/031,334

(22) Filed: Feb. 21, 2011

(65) Prior Publication Data

US 2011/0138876 A1    Jun. 16, 2011

Related U.S. Application Data

(62) Division of application No. 11/921,380, filed as application No. PCT/EP2006/062212 on May 10, 2006, now Pat. No. 7,997,064.

(30) Foreign Application Priority Data

May 31, 2005    (DE) .......................... 10 2005 024 872

(51) Int. Cl.
*F01N 3/00* (2006.01)
(52) U.S. Cl.
USPC ................. 60/285; 60/273; 60/277; 60/295
(58) Field of Classification Search
USPC ................................................... 60/274–324
See application file for complete search history.

(56) References Cited

U.S. PATENT DOCUMENTS

| | | | | |
|---|---|---|---|---|
| 5,103,640 A | * | 4/1992 | Nada et al. ...................... | 60/204 |
| 5,678,402 A | * | 10/1997 | Kitagawa et al. ............... | 60/276 |
| 6,216,450 B1 | | 4/2001 | Takahashi et al. .............. | 60/276 |

(Continued)

FOREIGN PATENT DOCUMENTS

| | | |
|---|---|---|
| DE | 4331153 A1 | 3/1994 |
| DE | 19859176 A1 | 7/2000 |
| DE | 10307010 B3 | 5/2004 |
| EP | 1191196 A2 | 3/2002 |
| EP | 1437501 A1 | 7/2004 |

OTHER PUBLICATIONS

International PCT Search Report, PCT/EP2006/062212, 4 pages, Aug. 11, 2006.

*Primary Examiner* — Thomas Denion
*Assistant Examiner* — Jesse Bogue
(74) *Attorney, Agent, or Firm* — King & Spalding L.L.P.

(57) ABSTRACT

An exhaust gas catalytic converter is laden with oxygen until it is saturated at least upstream of an exhaust gas probe. A predefined first rich air/fuel ration is set in a combustion chamber of a cylinder. A first oxygen storage capacity value is determined as a function of the measurement signal of an exhaust gas probe and the predefined first rich air/fuel ratio. The exhaust gas catalytic converter is laden with oxygen until it is saturated. A predefined second rich air/fuel ration is set in the combustion chamber of the cylinder. A second oxygen storage capacity value is determined as a function of the measurement signal of the exhaust gas probe and the predefined second rich air/fuel ration. A corrected oxygen storage capacity value is determined as a function of the first and second oxygen storage capacity values.

1 Claim, 2 Drawing Sheets

U.S. PATENT DOCUMENTS

| | | | |
|---|---|---|---|
| 6,230,487 B1 | 5/2001 | Blumenstock et al. | 60/286 |
| 6,374,596 B2 | 4/2002 | Taga et al. | 60/277 |
| 6,840,036 B2 | 1/2005 | Fiengo et al. | 60/285 |
| 6,877,311 B2 | 4/2005 | Uchida | 60/277 |
| 2003/0017603 A1 | 1/2003 | Uchida et al. | 436/37 |
| 2004/0006971 A1 | 1/2004 | Kamoto et al. | 60/277 |

\* cited by examiner

METHOD AND DEVICE FOR DETERMINING AN OXYGEN STORAGE CAPACITY OF A CATALYTIC CONVERTER OF AN INTERNAL COMBUSTION ENGINE AND METHOD AND DEVICE FOR DETERMINING A DYNAMIC TIME DURATION FOR EXHAUST PROBES OF AN INTERNAL COMBUSTION ENGINE

CROSS REFERENCE TO RELATED APPLICATIONS

This application is a divisional of U.S. patent application Ser. No. 11/921,380 filed Nov. 30, 2007 now U.S. Pat. No. 7,997,064, which is a U.S. National Stage Application of International Application No. PCT/EP2006/062212 filed May 10, 2006, which designates the United States of America, and claims priority to German Application No. 10 2005 024 872.1 filed May 31, 2005, the contents of which are hereby incorporated by reference in their entirety.

FIELD OF INVENTION

The invention relates to a method and a device for determining an oxygen storage capacity of a catalytic converter of an internal combustion engine. It further relates to a method and a device for determining a dynamic time duration for exhaust probes of an internal combustion engine.

BACKGROUND OF INVENTION

Increasingly stringent legal requirements in respect of permissible pollutant emissions from motor vehicles powered by internal combustion engines make it necessary to minimize the pollutant emissions during operation of the internal combustion engine. This can be achieved on the one hand by reducing the pollutant emissions produced during combustion of the air/fuel mixture in the relevant cylinder of the internal combustion engine. On the other hand, exhaust after-treatment systems are used in internal combustion engines to convert the pollutant emissions produced during the combustion process of the air/fuel mixture in the relevant cylinder into harmless substances. For this purpose, catalytic converters are used which convert the carbon monoxide, hydrocarbons and nitrogen oxides into harmless substances. Selectively controlling the generation of the pollutant emissions during combustion and converting the pollutants with a high degree of efficiency by means of the catalytic converter both require a very precisely adjusted air/fuel ratio in the relevant cylinder.

In this context it must be ensured that the components of the exhaust after-treatment system operate in the desired manner over a long service life and faults are reliably detected.

SUMMARY OF INVENTION

An object of the invention is, according to one aspect, to create a method and a device for precisely determining an oxygen storage capacity of a catalytic converter of an internal combustion engine. According to another aspect, the object of the invention is to create a method and a device for precisely determining a dynamic time duration for exhaust probes of an internal combustion engine.

This object is achieved by the features of the independent claims. Advantageous embodiments of the invention are set forth in the sub-claims.

The invention is characterized, according to a first aspect, by a method and a corresponding device for determining an oxygen storage capacity of a catalytic converter of an internal combustion engine having at least one cylinder and an exhaust tract in which are disposed the catalytic converter and an exhaust probe downstream of at least one part of said catalytic converter. The part of the catalytic converter that is upstream of the exhaust probe is oxygenated until it is saturated. A predefined first rich air/fuel ratio is set in the combustion chamber of the cylinder. A first oxygen storage capacity value is determined as a function of the measurement signal of the exhaust probe and the predefined first rich air/fuel ratio. The part of the catalytic converter that is upstream of the exhaust probe is oxygenated until it is saturated. A predefined second rich air/fuel ratio is set in the combustion chamber of the cylinder. A second oxygen storage capacity value is determined as a function of the measurement signal of the exhaust probe and the predefined second rich air/fuel ratio. A corrected oxygen storage capacity value is determined as a function of the first and second oxygen storage capacity values.

The invention uses the knowledge that a changed response characteristic of the exhaust probe, due to aging or the like, results in an error in determining the first and second oxygen storage capacity values which, however, are different because of the different air/fuel ratio. This provides a simple means of determining the corrected oxygen storage capacity value as a function of the first and second oxygen storage capacity value and thus largely eliminating in a simple manner the error caused by the changed response characteristic of the exhaust probe.

According to a second aspect, the invention is characterized by a method and a corresponding device for determining an oxygen storage capacity of a catalytic converter of an internal combustion engine with at least one cylinder and an exhaust tract in which are disposed the catalytic converter and an exhaust probe downstream of at least one part of said catalytic converter. The oxygen stored in the part of the catalytic converter that is upstream of the exhaust probe is completely discharged. A predefined first lean air/fuel ratio in the combustion chamber of the cylinder is set. A first oxygen storage capacity value is determined as a function of the measurement signal of the exhaust probe and the predefined first lean air/fuel ratio. The oxygen stored in the part of the catalytic converter upstream of the exhaust probe is completely discharged. A predefined second lean air/fuel ratio in the combustion chamber of the cylinder is set. A second oxygen storage capacity value is determined as a function of the measurement signal of the exhaust probe and the predefined second lean air/fuel ratio. A corrected oxygen storage capacity value is determined as a function of the first and second oxygen storage capacity values. In a procedure corresponding to the first aspect of the invention, errors in determining the oxygen storage capacity value can also be largely eliminated in this way.

According to a preferred embodiment, a correction value is determined as a function of a difference between the first and second oxygen storage capacity value and the corrected oxygen storage capacity value is determined as a function of the second oxygen storage capacity value and the correction value, thus enabling the corrected oxygen storage capacity value to be very easily determined.

In this context it is advantageous if the correction value is determined from an engine map as a function of a difference between the first and second oxygen storage capacity value. This is particularly precise and the engine map can be easily determined by tests or simulations.

According to another advantageous embodiment, the correction value is determined as a function of the difference between the first and second oxygen storage capacity value by means of a piecewise linear function. This has the advantage of a low memory requirement for the piecewise linear function and enables the correction value to be easily and precisely determined.

According to a further advantageous embodiment, the correction value is determined as a function of the first, second or a third rich or lean air/fuel ratio. The third rich or lean air/fuel ratio is less rich or less lean than the first or second. This enables the correction value to be precisely determined in a simple manner.

Preferably the third rich or lean air/fuel ratio is appropriately specified such that it is suitably close to the stoichiometric air/fuel ratio. The third rich or lean air/fuel ratio therefore preferably essentially corresponds to the stoichiometric air/fuel ratio. In this context, the knowledge is used that, with the third rich or lean air/fuel ratio appropriately selected, a change in the response time of the exhaust probe only has a negligible effect on an oxygen storage capacity value determinable in such a manner.

In this connection it is particularly advantageous if the correction value is determined as a function of a difference between the third and second air/fuel ratio divided by a difference between the first and second air/fuel ratio. This provides a simple means of determining the correction value extremely precisely.

Particularly advantageously, catalytic converter diagnostics can be performed on the basis of the corrected oxygen storage capacity value. The corrected oxygen storage capacity value is a measure of the efficiency of the catalytic converter. For example, the diagnostics can include checking that the corrected oxygen storage capacity value is within a predefinable value range.

According to a third aspect, the invention is characterized by a method and a corresponding device for determining a dynamic time duration of an exhaust probe of an internal combustion engine with at least one cylinder and an exhaust tract in which are disposed the computer catalytic converter and the exhaust probe downstream of part of said catalytic converter. The part of the catalytic converter upstream of the exhaust probe is oxygenated until it is saturated. A predefined first rich air/fuel ratio is set in the combustion chamber of the cylinder. A first oxygen storage capacity value is determined as a function of the measurement signal of the exhaust probe and the predefined first rich air/fuel ratio. The part of the catalytic converter upstream of the exhaust probe is oxygenated until it is saturated. A predefined second rich air/fuel ratio is set in the combustion chamber of the cylinder. A second oxygen storage capacity value is determined as a function of the measurement signal of the exhaust probe and the predefined first rich air/fuel ratio and the dynamic time duration. The dynamic time duration is determined as a function of the first and second oxygen storage capacity values.

The dynamic time duration represents the change over time of the response characteristic of the exhaust probe compared to its as-new condition. The dynamic time duration can thus be easily and precisely determined.

According to a fourth aspect, the invention is characterized by a method and a corresponding device for determining the dynamic time duration for an exhaust probe of the internal combustion engine. The fourth aspect differs from the third aspect in that the first and second oxygen storage capacity values are determined according to the procedure of the second aspect of the invention.

According to an advantageous embodiment of the third or fourth aspect of the invention, diagnostics for the first and/or second exhaust probe are performed on the basis of the dynamic time duration. The diagnostics can consist, for example, of checking the dynamic time duration for over- or undershooting of a predefinable value range.

BRIEF DESCRIPTION OF THE DRAWINGS

Exemplary embodiments of the invention will now be explained with reference to the accompanying schematic drawings in which.

Elements of identical construction or function are identified by the same reference signs throughout the figures.

DETAILED DESCRIPTION OF INVENTION

Figure 1:
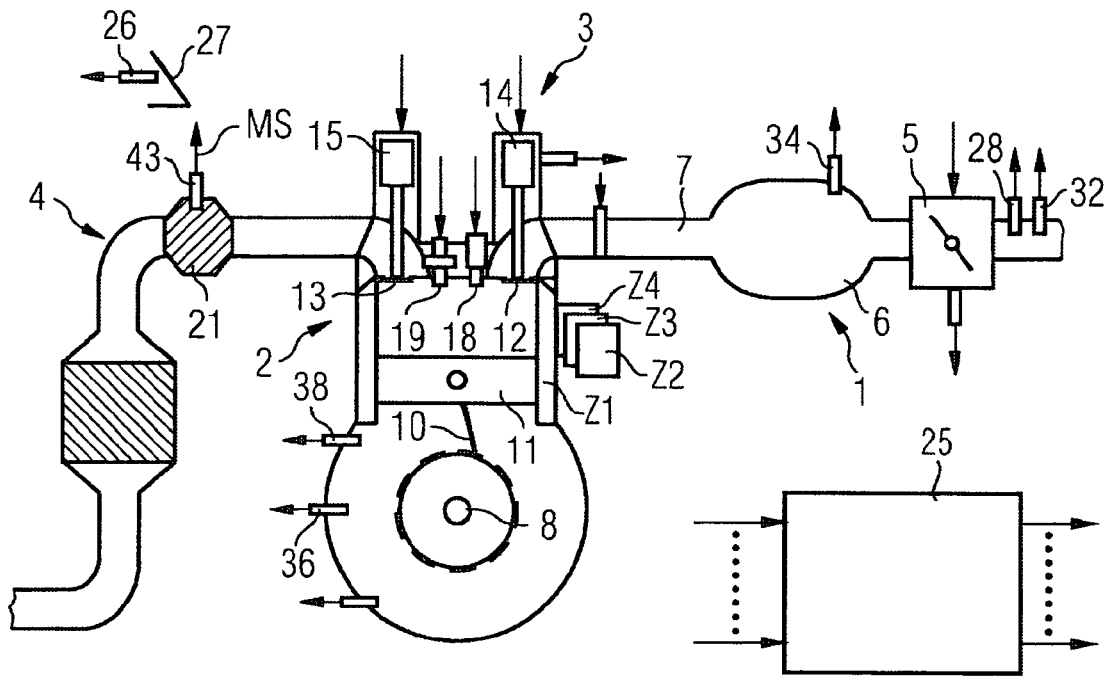
FIG. 1 shows an internal combustion engine with a control device.

An internal combustion engine (FIG. 1) comprises an intake tract 1, a cylinder block 2, a cylinder head 3 and an exhaust tract 4. The intake tract 1 preferably comprises a throttle valve 5, also a plenum 6 and an intake pipe 7 leading to a cylinder Z1 via an inlet port in the cylinder block 2. The cylinder block 2 additionally comprises a crankshaft 8 which is linked to the piston 11 of the cylinder Z1 via a connecting rod 10.

The cylinder head 3 incorporates a valve operating mechanism with a gas inlet valve 12 and a gas outlet valve 13.

The cylinder head 3 additionally comprises an injection valve 18 and a spark plug 19. Alternatively the injection valve 18 can also be disposed in the intake pipe 7.

In the exhaust tract there is disposed a catalytic converter system comprising a three-way converter 21. However, the catalytic converter system can comprise another or a plurality of other three-way converters or also, for example, a NOx catalyst.

A control device 25 is provided to which sensors are assigned which detect various measured variables and determine the value of the measured variable in each case. The control device 25 determines, as a function of at least one of the measured variables, manipulated variables which are then converted into one or more actuating signals for controlling the final control elements by means of corresponding actuators. The control device 25 can also be termed a device for controlling the internal combustion engine.

The sensors are a pedal position sensor 26 which detects a position of an accelerator pedal 27, a mass airflow sensor 28 which detects a mass airflow upstream of the throttle valve 5, a first temperature sensor 32 which detects an intake air temperature, an intake pipe pressure sensor 34 which detects an intake pipe pressure in the plenum 6, a crankshaft angle sensor 36 which detects a crankshaft angle to which an engine speed is then assigned.

There is additionally provided an exhaust probe 43 which is disposed downstream of at least part of the three-way catalytic converter 21 and which detects a residual oxygen content of the exhaust gas and whose measurement signal is characteristic of the air/fuel ratio in the combustion chamber of the cylinder Z1 and upstream of the exhaust probe 43 prior to oxidation of the fuel, hereinafter referred to as the air/fuel ratio downstream of the catalytic converter. The exhaust probe 43 is preferably disposed in the three-way catalytic converter 21. However, it can also be disposed downstream of the three-way catalytic converter 21.

The exhaust probe 43 is preferably a binary lambda probe. However, it can also be a linear lambda probe.

Depending on the embodiment of the invention, any subset of the above-mentioned sensors can be present or additional sensors can also be present.

The final control elements can be for example, the throttle valve 5, the gas inlet and outlet valves 12, 13, the injection valve 18 or the spark plug 19.

In addition to the cylinder Z1, further cylinders Z2 to Z4 are preferably also provided to which corresponding final control elements and in some cases sensors are then also assigned.

A program is stored in a program memory of the control device 25 and can be executed during operation of the internal combustion engine. By means of the program, a corrected oxygen storage capacity value OSC_COR can be determined or also a dynamic time duration DELTA_T.

The program is launched in a step S1 (FIG. 2) in which variables are initialized if necessary. Thus, for example, in step S1, first and second oxygen storage capacity values OSC1, OSC2 are assigned a neutral value. The program is preferably launched if a new corrected oxygen storage capacity value OSC_COR or a new dynamic time duration DELTA_T is to be determined. This can be performed, for example, once per engine run or also at fixed time intervals or also after a specifiable mileage.

In a step S3, the part of the three-way catalytic converter 21 upstream of the exhaust probe is oxygenated until it is saturated.

In a step S5, a predefined first air/fuel ratio LAM1_SP in the combustion chambers of the cylinder Z1 to Z4 is specified and preferably set by influencing the amount of fuel to be dosed. The first predefined air/fuel ratio LAM1_SP is specified such that it has an increased proportion of fuel compared to a stoichiometric air/fuel ratio.

A step S7 is executed after the predefined first air/fuel ratio LAM1_SP has been specified, i.e. at a point in time when a corresponding air/fuel ratio has not yet necessarily been actually set. In the step S7 it is checked whether, upstream of the three-way catalytic converter 21, the predefined first air/fuel ratio LAM1_SP in the combustion chambers of the cylinders Z1 to Z4 is less than a predefined threshold value LAM_THD. In this step it is therefore also taken into account that the predefined first air/fuel ratio LAM1_SP is only set with a certain delay in the region of the exhaust tract on the input side of the three-way catalytic converter 21 depending on gas transit times. This can be taken into account, for example, by appropriate modeling of the gas transit times.

The threshold value LAM_THD preferably corresponds to the stoichiometric air/fuel ratio. The threshold value LAM_THD is therefore preferably selected such that if the stoichiometric air/fuel ratio is undershot, discharging of the oxygen stored in the three-way catalytic converter 21 begins.

If the condition of step S7 is not fulfilled, processing is continued in a step S9 in which the program dwells for a predefinable period or a predefinable crankshaft angle before processing is re-continued in step S7. The time the program dwells in step S9 is selected suitably short, i.e. such that changes in the predefined first air/fuel ratio LAM1_SP checked in step S7 can be checked promptly and with high precision.

If, on the other hand, the condition of step S7 is fulfilled, in a step S11 a term is added to a first oxygen storage capacity value OSC1, this term being the integral of a mass airflow MAF into the cylinders Z1 to Z4 multiplied by one minus the reciprocal of the predefinded first air/fuel ratio LAM1_SP. In this context, as in step S7, the gas transit times are likewise taken into account for the specified first air/fuel ratio LAM1_SP.

The term is additionally multiplied via an oxygen factor O2_FAC which represents the proportion of oxygen in the mass airflow MAF. The oxygen factor O2_FAC has e.g. the value 0.23. Integration is performed over the time since the last execution of step S11 in the current program run.

Alternatively, however, processing after step S5 can also be continued directly in step S11.

In a step S13 it is checked whether the air/fuel ratio LAM_MEAS detected by the exhaust probe 43 is less than the threshold value LAM_THD. If this is not the case, processing is re-continued in step S11.

On the other hand, if the condition of step S13 is fulfilled, in a step S15 the three-way catalytic converter 21 is re-oxygenated—possibly after a certain time duration—until at least the part of the three-way catalytic converter 21 upstream of the exhaust probe 43 is saturated.

In a step S18, a predefined second air/fuel ratio LAM2_SP is then specified and set in the combustion chambers of the cylinders Z1 to Z4. The predefined second air/fuel ratio LAM2_SP is different from the predefined first air/fuel ratio LAM1_SP. For example, it can have an air ratio value of 0.9 and the predefined first air/fuel ratio LAM1_SP an air ratio value of e.g. 0.8, for example. Preferably but not necessarily, the values in respect of the air ratio of the predefined first and second air/fuel ratios are approximately in a range of 0.7 to 0.9.

Processing is then continued in a step S20 analogously to step S7. If the condition of step S20 is not fulfilled, after a dwell in a step S22 corresponding to step S9, processing is re-continued in step S20. On the other hand, if the condition of step S20 is fulfilled, in a step S24 the corresponding term is added to the second oxygen storage capacity value OSC2 as in step S11. Alternatively, after step S18 processing can also be correspondingly continued directly in step S24.

In a step S26 it is checked, analogously to step S13, whether the air/fuel ratio LAM_MEAS measured by the exhaust probe 43 is less than the predefined threshold value LAM_THD. If the condition of step S26 is not fulfilled, processing is re-continued in step S24. On the other hand, if the condition of step S26 is fulfilled, no more oxygen is absorbed in the three-way catalytic converter 21 upstream of the exhaust probe 43.

In a step S28, a correction value COR is then determined as a function of the difference between the first and second oxygen storage capacity value OSC1, OSC2.

Then, in a step S30, a corrected oxygen storage capacity value OSC_COR is determined by multiplying the second oxygen storage capacity value OSC2 by the correction value COR. The program is then terminated in a step S32.

By means of the corrected oxygen storage capacity value OSC_COR, for example, three-way catalytic converter diagnostics can be carried out. Preferably the steps S5 to S13 and S18 to S28 are performed during a regeneration phase of the NOx storage catalyst. If a NOx storage catalyst is not present, the corresponding steps are preferably carried out during a so-called purge phase of the three-way catalytic converter 21. For example, the purge phase follows overrun fuel cutoff of the internal combustion engine.

By means of the corrected oxygen storage capacity value OSC_COR, diagnostics can be carried out for the three-way catalytic converter 21. This can be done, for example, by checking whether the corrected oxygen storage capacity value OSC_COR is within a predefined value range. The procedure according to steps S5 to S13 and S18 to S28 can also be termed a breakthrough method.

In step S28, the correction value COR can be determined, for example, from an engine map as a function of the difference between the first and second oxygen storage capacity value, the term engine map also being understandable as a so-called characteristic. The engine map can be easily determined by tests, e.g. on an engine test stand, or by suitable simulations and is stored in a data memory of the control device 25.

Alternatively, in step S28 the correction value can also be determined as a function of the difference between the first and second oxygen storage capacity value OSC1, OSC2 by means of a piecewise linear function. The piecewise linear function preferably has two linear sections whose gradients depend on the sign of the difference between the first and second oxygen storage capacity value OSC1, OSC2. The relevant gradients and straight line sections can likewise be determined by suitable tests, e.g. on the engine test stand, or by suitable simulations and stored in the data memory of the control device 25.

The correction value COR can also be determined, in a step S38, as a function of the difference between the first and second oxygen storage capacity value OSC1, OSC2, the predefined first and second air/fuel ratios LAM1_SP, LAM2_SP and a predefined third air/fuel ratio LAM3_SP in the combustion chambers of the cylinders Z1 to Z4. The predefined third air/fuel ratio LAM3_SP is less rich than the first and second predefined air/fuel ratio and is preferably virtually the stoichiometric air/fuel ratio. For example, it can have a value of 0.9999 relative to the excess air ratio.

The correction value COR is calculated in step S38, preferably by means of the formula specified there. By suitably selecting the predefined third air/fuel ratio LAM3_SP, the correction value COR can thus be very precisely determined. If the correction value COR is calculated according to step S38, the corrected oxygen storage capacity value OSC_COR is preferably determined in step S36 by taking a difference between the second oxygen storage capacity value OSC2 and the correction value.

Alternatively or in addition to steps S28 and S30 or S38 and S36, a step S34 can also be provided in which the dynamic time duration DELTA_T is determined as a function of the difference between the first and second oxygen storage capacity value OSC1, OSC2, the mass airflow MAF, the oxygen factor O2_FAC and the predefined first and second air/fuel ratios LAM1_SP, LAM2_SP, preferably according to the formula specified in step S34.

The dynamic time duration DELTA_T represents changes in the response time of the exhaust probe 43 compared to the as-new condition of the exhaust probe 43 and can thus be used, for example, for diagnostics of the exhaust probe dynamics. In particular, this can be performed by checking whether the dynamic time duration DELTA_T exceeds or undershoots a predefinable value range.

The second predefined air/fuel ratio LAM2_SP is preferably less rich than the predefined first air/fuel ratio LAM1_SP. However, it can also be vice versa, with the result that the sign of the correction value COR may have to be adapted.

Figure 2:
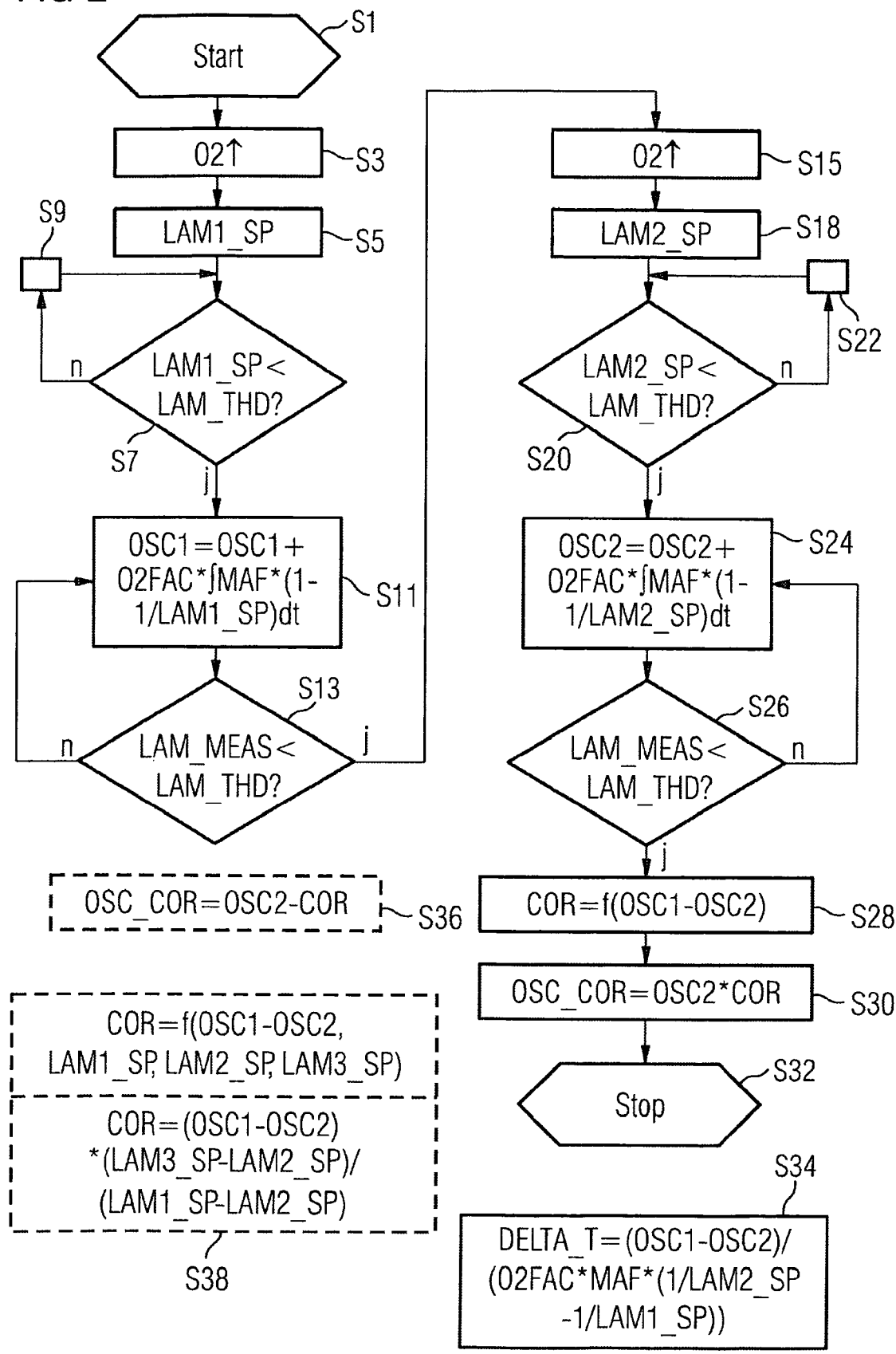
FIG. 2 shows a flowchart of a program which is executed in the control device.

In an alternative embodiment, the program according to FIG. 2 can also be written such that in the steps S3 and S15 the oxygen stored in the three-way catalytic converter 21 is completely discharged, at least in the section upstream of the exhaust probe 43. The predefined first and second air/fuel ratios LAM1_SP, LAM2_SP specified in steps S9 and S18 are then selected correspondingly lean, the predefined first air/fuel ratio LAM1_SP then preferably being leaner than the predefined second air/fuel ratio LAM2_SP. In the conditions of steps S5, S13, S20 and S26 the less-than sign is then replaced by a greater-than sign.

Figure 3:
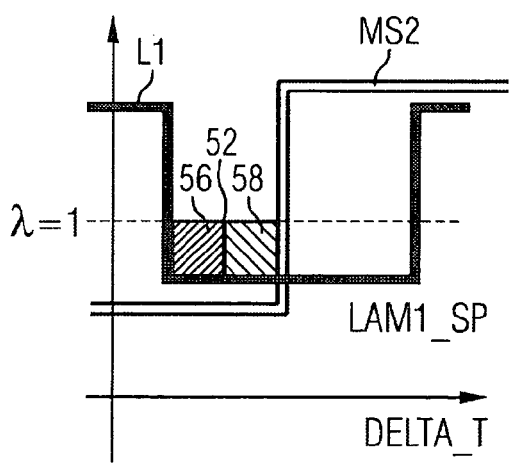
FIGS. 3 and 4 show various signal characteristics.
Figure 4:
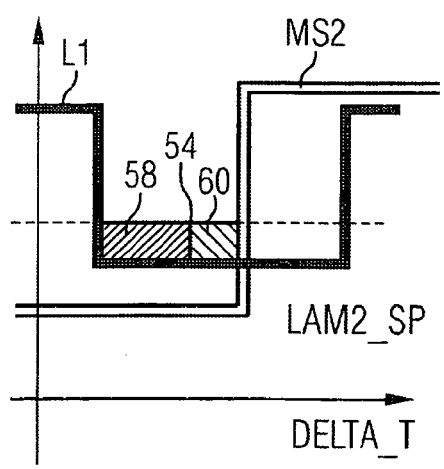

The measurement signals MS of the exhaust probe 43 and the air ratio L1 corresponding to the first and second predefined air/fuel ratio are shown in FIGS. 3 and 4 respectively. The dashed line represents the stoichiometric air ratio. The area of the rectangle marked 52 is representative of the first oxygen storage capacity value OSC1. The area provided with reference character 54 in FIG. 4 is representative of the second oxygen storage capacity value OSC2. The sub-areas 56 and 58 have the same area and correspond to the true oxygen storage capacity value. The sub-areas 58 and 60 extend over the dynamic time duration DELTA_T and their area is therefore a function of the relevant predefined first or second air/fuel ratio LAM1_SP, LAM2_SP. The more closely the relevant predefined air/fuel ratio corresponds to the stoichiometric air/fuel ratio, the lower the overall proportion of the sub-areas relative to the overall area.

What is claimed is:

1. A method for determining a dynamic time duration of an exhaust probe of an internal combustion engine having at least one cylinder, an exhaust tract and the exhaust probe, comprising:
   oxygenating a first time the part of the catalytic converter upstream of the exhaust probe until it is saturated;
   setting a predefined first rich air/fuel ratio in the combustion chamber of the cylinder;
   determining a first oxygen storage capacity value based on a measurement signal of the exhaust probe and the predefined first rich air/fuel ratio;
   oxygenating a second time the part of the catalytic converter upstream of the exhaust probe until it is saturated;
   setting a predefined second rich air/fuel ratio in the combustion chamber of the cylinder;
   determining a second oxygen storage capacity value based on the measurement signal of the exhaust probe and the predefined first rich air/fuel ratio;
   determining a corrected oxygen storage capacity value based on the first and second oxygen storage capacity values; and
   determining a dynamic time duration based on the first and second oxygen storage capacity values.

* * * * *